Patented June 25, 1929.

1,718,666

UNITED STATES PATENT OFFICE.

WALTER SCHOELLER, OF BERLIN-WESTEND, AND HANS JORDAN, OF BERLIN-STEGLITZ, GERMANY, ASSIGNORS TO THE FIRM: CHEMISCHE FABRIK AUF ACTIEN, VORM. E. SCHERING., OF BERLIN, GERMANY.

PRODUCTION OF MENTHOL.

No Drawing. Application filed June 20, 1927, Serial No. 200,298, and in Germany June 29, 1926.

Our invention refers to the production of alkyl isopropyl phenols and more especially menthol.

As disclosed in the copending application for patent of the United States Serial No. 280,290 filed of even date herewith by Hans Jordan, alkyl isopropylene phenol, such as 3-methyl-6-isopropylene phenol

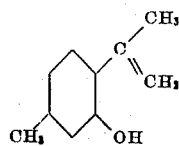

and 4-methyl-6-isopropylene phenol

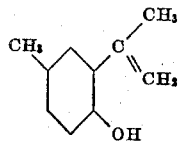

can be obtained by heating the condensation products from a ketone, such as acetone, and an alkyl phenol, such as m-cresol and p-cresol, respectively, to about 300 to 310° C., to effect decomposition, and subjecting the products of decomposition to fractional distillation, preferably in vacuo.

We have now ascertained that by treating these products with hydrogen in the presence of a suitable hydrogenation catalyst so as to introduce eight atoms hydrogen, we are enabled to convert them into menthol and its isomers and homologues, being the corresponding phenols saturated in the side chain.

Example 1

3-methyl-6-isopropylene phenol is treated with hydrogen at 140–160° C. and, if desired, under pressure in the presence of a mixed catalyst containing Ni and another metal, such as Cu, Co, Fe, and the like, either in reduced state or as carbonates, hydroxides, or the like, until eight hydrogen atoms have entered the combination. There is thus obtained menthol.

Example 2

4-methyl-6-isopropylene phenol is treated with hydrogen at 140–160° C. and, if desired, under pressure in the presence of a mixed catalyst, containing Ni and another metal, such as Cu, Co, Fe, and the like, either in reduced state or as carbonates, hydroxides, or the like, until eight hydrogen atoms have entered the combination. There is thus obtained 4-methyl-6-isopropyl cyclo hexanol (1), this being the hitherto unknown p-menthol.

Various changes may be made in the details disclosed in the foregoing specification without departing from the invention or sacrificing the advantages thereof.

We claim:—

1. The process of producing a menthol comprising acting on a methyl isopropylene phenol at a temperature between 100 and 200° C. in the presence of a normal hydrogenation catylist with hydrogen, until eight hydrogen atoms have entered into combination.

2. As a new product, 4-methyl-6-isopropyl cyclo hexanol (1) or p-menthol having the formula

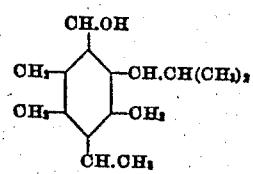

In testimony whereof we affix our signatures.

WALTER SCHOELLER.
HANS JORDAN.